(12) United States Patent
Shao et al.

(10) Patent No.: US 12,510,889 B2
(45) Date of Patent: Dec. 30, 2025

(54) METHODS AND INTERNET OF THINGS SYSTEMS FOR MAINTAINING AND MANAGING STORAGE AND DISTRIBUTION STATION OF SMART GAS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Guanghua Huang, Chengdu (CN); Haitang Xiang, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 426 days.

(21) Appl. No.: 18/066,992

(22) Filed: Dec. 15, 2022

(65) Prior Publication Data
US 2023/0117676 A1 Apr. 20, 2023

(30) Foreign Application Priority Data
Dec. 7, 2022 (CN) .......................... 202211560622.0

(51) Int. Cl.
*G05B 23/02* (2006.01)
*G06Q 50/06* (2024.01)
*G16Y 40/40* (2020.01)

(52) U.S. Cl.
CPC ..... *G05B 23/0283* (2013.01); *G05B 23/0243* (2013.01); *G06Q 50/06* (2013.01); *G16Y 40/40* (2020.01)

(58) Field of Classification Search
CPC ............ G05B 23/0283; G05B 23/0243; G16Y 40/40; G16Y 10/35; G16Y 20/30; G06Q 50/06; G01F 25/15; G01F 15/061; G05D 2107/50; H04L 12/2803; H04L 12/2852; H04L 12/2801; H04L 12/2854; H04L 12/28
See application file for complete search history.

(56) References Cited

U.S. PATENT DOCUMENTS 10,637,683 B2 * 4/2020 Funk .................. G01C 21/3415
11,262,743 B2 * 3/2022 Shetty B ............ G05B 23/0289
(Continued)

*Primary Examiner* — Alvaro E Fortich
*Assistant Examiner* — Martin Walter Braunlich
(74) *Attorney, Agent, or Firm* — METIS IP LLC

(57) ABSTRACT

The embodiments of the present disclosure provide method and Internet of Things (IoT) systems for maintaining and managing a storage and distribution station of smart gas. The method may be executed by a smart gas device management platform of the IoT system for maintaining and managing the storage and distribution station of smart gas. The method may include: obtaining gas tank data and gas tank environmental data of a target gas tank of a gas storage and distribution station; obtaining image data of the target gas tank, and predicting gas tank aging data of the target gas tank based on the image data; predicting, based on the gas tank aging data, the gas tank data, and the gas tank environmental data, gas tank damage data of the target gas tank; and determining a maintenance plan of the target gas tank based on the gas tank damage data.

13 Claims, 5 Drawing Sheets

(56) References Cited

U.S. PATENT DOCUMENTS

| | | | |
|---|---|---|---|
| 11,626,730 B2* | 4/2023 | Mehta | H02J 3/28 |
| | | | 700/287 |
| 11,852,563 B2* | 12/2023 | Swaroop | B67D 7/085 |
| 12,149,875 B2* | 11/2024 | Fu | G16Y 10/35 |
| 12,189,383 B2* | 1/2025 | Upadhyay | G07C 5/008 |
| 2021/0202113 A1* | 7/2021 | Munoz | G01N 29/2481 |
| 2021/0241391 A1* | 8/2021 | Carroll | G06Q 30/0206 |

* cited by examiner

METHODS AND INTERNET OF THINGS SYSTEMS FOR MAINTAINING AND MANAGING STORAGE AND DISTRIBUTION STATION OF SMART GAS

CROSS-REFERENCE TO RELATED APPLICATION

This application claims priority of Chinese Patent Application No. 202211560622.0, filed on Dec. 7, 2022, the contents of which are entirely incorporated herein by reference.

TECHNICAL FIELD

The present disclosure relates to the field of gas management, and in particular, to methods and Internet of Things (IoT) systems for maintaining and managing a storage and distribution station of smart gas.

BACKGROUND

In most cases, a gas tank is usually set in open air, and the gas tank is inevitably affected by sun, wind, rain, and changes in ambient temperature (for example, the gas tank expands with heat and contracts with cold, etc.), which leads to aging of the gas tank (for example, skin of the gas tank is cracked, an anti-corrosion layer of paint is peeled off, etc.), thereby reducing service life of the gas tank and posing a threat to safety of gas use.

In the prior art, staffs are usually arranged to inspect the gas tank regularly or irregularly, which requires high labor time costs. Since the gas tank needs to be inspected comprehensively, there may be a risk of falling from a high altitude for the staffs. In addition, there is also an uncertainty about accuracy of the manual inspection.

Therefore, it is desirable to provide a method for maintaining and managing a storage and distribution station of smart gas, which can intelligently predict an aging and corrosion degree and a maintenance period of the gas tank, reduce labor time costs, and ensure safety and reliability of gas use.

SUMMARY

One of the embodiments of the present disclosure provides a method for maintaining and managing a storage and distribution station of smart gas. The method is executed by a smart gas device management platform of an Internet of Things (IoT) system for maintaining and managing a storage and distribution station of smart gas. The method may include: obtaining gas tank data and gas tank environmental data of a target gas tank of a gas storage and distribution station; obtaining image data of the target gas tank, and predicting gas tank aging data of the target gas tank based on the image data; predicting, based on the gas tank aging data, the gas tank data, and the gas tank environmental data, gas tank damage data of the target gas tank; and determining a maintenance plan of the target gas tank based on the gas tank damage data.

One of the embodiments of the present disclosure provides an Internet of Things (IoT) system for maintaining and managing a storage and distribution station of smart gas. The IoT system may include: a smart gas user platform, a smart gas service platform, a smart gas device management platform, a smart gas sensor network platform, and a smart gas object platform. The smart gas object platform may be configured to obtain gas tank data, gas tank environmental data, and image data of a target gas tank of a gas storage and distribution station, and transmit the gas tank data, the gas tank environmental data, and the image data to the smart gas device management platform through the smart gas sensor network platform; the smart gas device management platform is configured to: predict gas tank aging data of the target gas tank based on the image data; predict, based on the gas tank aging data, the gas tank data, and the gas tank environmental data, gas tank damage data of the target gas tank; determine, based on the gas tank damage data, a maintenance plan of the target gas tank; and send the maintenance plan of the target gas tank to the smart gas user platform; and the smart gas service platform is configured to send the maintenance plan of the target gas tank to the smart gas user platform.

One of the embodiments of the present disclosure provides a non-transitory computer-readable storage medium storing computer instructions. When the computer instructions in the storage medium are executed by a processor, the method for maintaining and managing a storage and distribution station of smart gas of the embodiments may be implemented.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
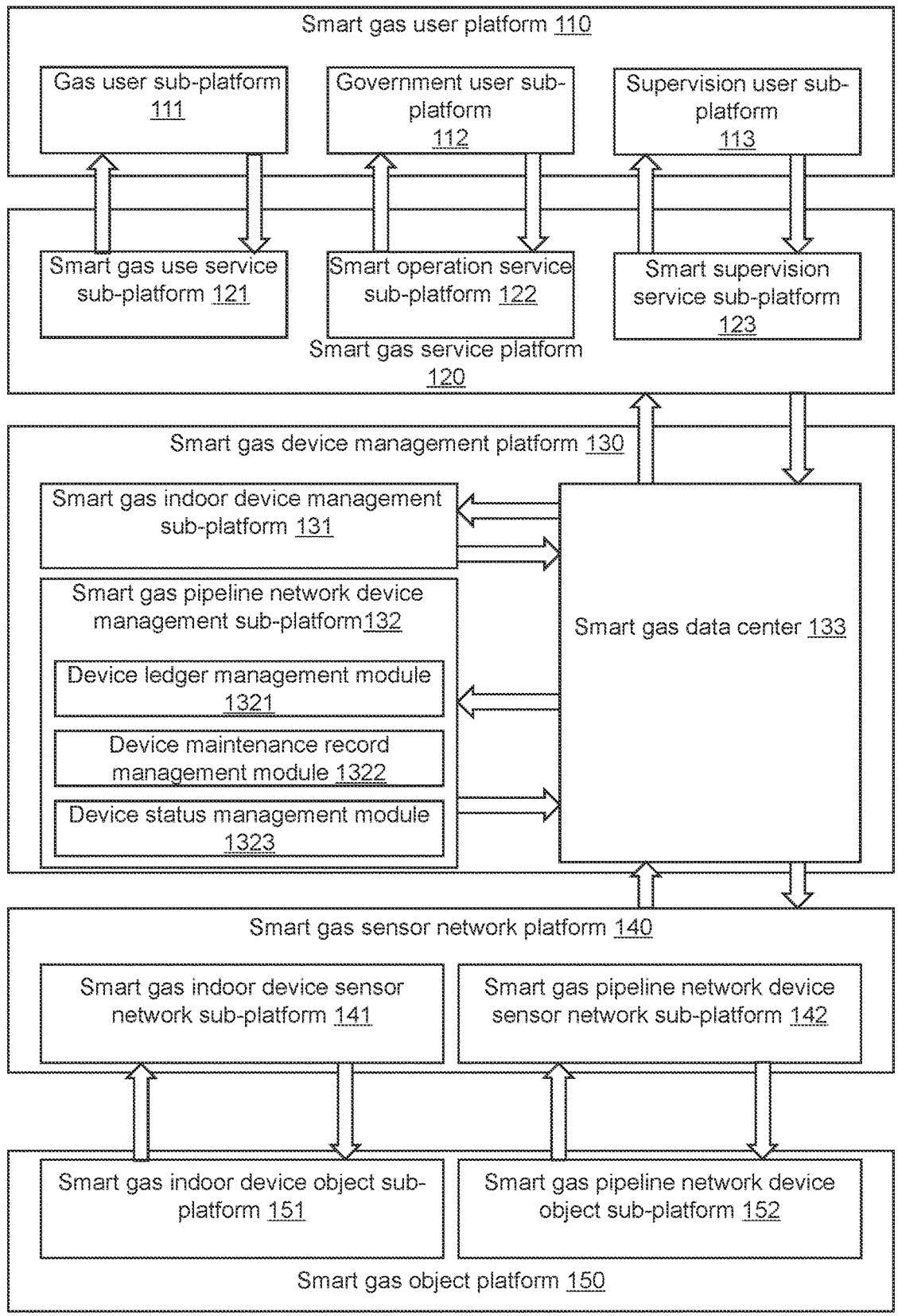
FIG. 1 is a schematic diagram illustrating an exemplary platform structure of an Internet of Things (IoT) system for maintaining and managing a storage and distribution station of smart gas according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

An Internet of Things (IoT) system may be an information processing system that includes part or all of a user platform, a service platform, a management platform, a sensing network platform, and an object platform. The user platform may be a functional platform for obtaining user perceptual information and generating control information. The service platform may realize connection between the management platform and the user platform, and play functions of perceptual information service communication and control information service communication. The management platform may overall plan and coordinate connection and cooperation among various functional platforms (e.g., the user platform and the service platform). The management platform may gather information of an IoT operation system and may provide functions of perception management and control management for the IoT operation system. The sensor network platform may connect the management platform and the object platform, and realize functions of perceptual communication sensor communication and control information sensor communication. The object platform may be a functional platform for generating perceptual information.

FIG. 1 is a schematic diagram illustrating an exemplary platform structure of an Internet of Things (IoT) system for maintaining and managing a storage and distribution station of smart gas according to some embodiments of the present disclosure.

In some embodiments, the IoT system 100 for maintaining and managing a storage and distribution station of smart gas may include a smart gas user platform 110, a smart gas service platform 120, a smart gas device management platform 130, a smart gas sensor network platform 140, and a smart gas object platform 150.

In some embodiments, the IoT system 100 for maintaining and managing a storage and distribution station of smart gas may obtain and process use condition information of a gas tank and external environment information of the gas tank, analyze and determine aging and damage conditions of the gas tank, so as to formulate a maintenance plan that matches an actual condition of the gas tank, and help the staff to accurately formulate the maintenance plan, timely repair the gas tank, and efficiently manage the gas tank.

The smart gas user platform 110 may refer to a platform for obtaining a query instruction from a user and feeding back the maintenance plan of the gas tank to the user. In some embodiments, the smart gas user platform 110 may be configured as a terminal device, such as a mobile phone, a tablet, a computer, etc. In some embodiments, the smart gas user platform 110 may interact with the smart gas service platform 120, obtain and issue the query instruction of the user to the smart gas service platform 120. For example, through the terminal device, the smart gas user platform 110 may obtain the query instruction of "query the maintenance plan of gas tank 1" input by the user, and issue the query instruction to the smart gas service platform 120 for query. In some embodiments, the smart gas user platform 110 may receive the maintenance plan of the gas tank uploaded by the smart gas service platform 120 and feedback the maintenance plan to the user.

In some embodiments, the smart gas user platform 110 may include a gas user sub-platform 111, a government user sub-platform 112, and a supervision user sub-platform 113. The gas user sub-platform 111 may refer to a platform for feeding back the maintenance plan of the gas tank to the gas user (e.g., a gas consumer, etc.). In some embodiments, the gas user sub-platform 111 may correspond to and interact with a smart gas use service sub-platform 121 to obtain a service of safe gas use. The government user sub-platform 112 may refer to a platform that provides data related to gas operation for a government user. In some embodiments, the government user sub-platform 112 may correspond to and interact with a smart operation service sub-platform 122 to obtain a gas operation service. The supervision user sub-platform 113 may refer to a platform that supervises operation of the IoT system 100 for maintaining and managing a storage and distribution station of smart gas for a supervision user (e.g., a user of a security department, etc.). In some embodiments, the supervision user sub-platform 113 may correspond to and interact with the smart supervision service sub-platform 123 to obtain a service of a safety supervision requirement.

The smart gas service platform 120 may refer to a platform for receiving and transmitting data and/or information of the gas tank. In some embodiments, the smart gas service platform 120 may interact with the smart gas user platform 110, receive the query instruction of the user issued by the smart gas user platform 110, and upload the maintenance plan of the gas tank to the smart gas user platform 110. In some embodiments, the smart gas service platform 120 may interact with the smart gas device management platform 130, issue the query instruction of the user to a smart gas data center 133 of the smart gas device management platform 130, and receive the maintenance plan of the gas tank uploaded by the smart gas data center 133.

In some embodiments, the smart gas service platform 120 may include the smart gas use service sub-platform 121, a smart operation service sub-platform 122, and a smart supervision service sub-platform 123. In some embodiments, the smart gas use service sub-platform 121 may correspond to the gas user sub-platform 111 to provide the gas user with information related to a gas device. In some embodiments, the smart operation service sub-platform 122 may correspond to the government user sub-platform 112 to provide the government user with information related to gas operation. In some embodiments, the smart supervision service sub-platform 123 may correspond to the supervision user sub-platform 113 to provide information related safety supervision for the supervision user.

The smart gas device management platform 130 may refer to a platform for overall planning and coordinating connection and cooperation among various functional platforms, gathering all the information of the IoT, and providing functions of perception management and control management for the IoT operation system. In some embodiments, the smart gas device management platform 130 may be configured to obtain gas tank data and gas tank environmental data of a target gas tank of the gas storage and distribution station; obtain image data of the target gas tank, and predict gas tank aging data of the target gas tank based on the image data; predict, based on the gas tank aging data, the gas tank data, and the gas tank environmental data, gas tank damage data of the target gas tank; and determine a maintenance plan of the target gas tank based on the gas tank damage data.

Figure 2:
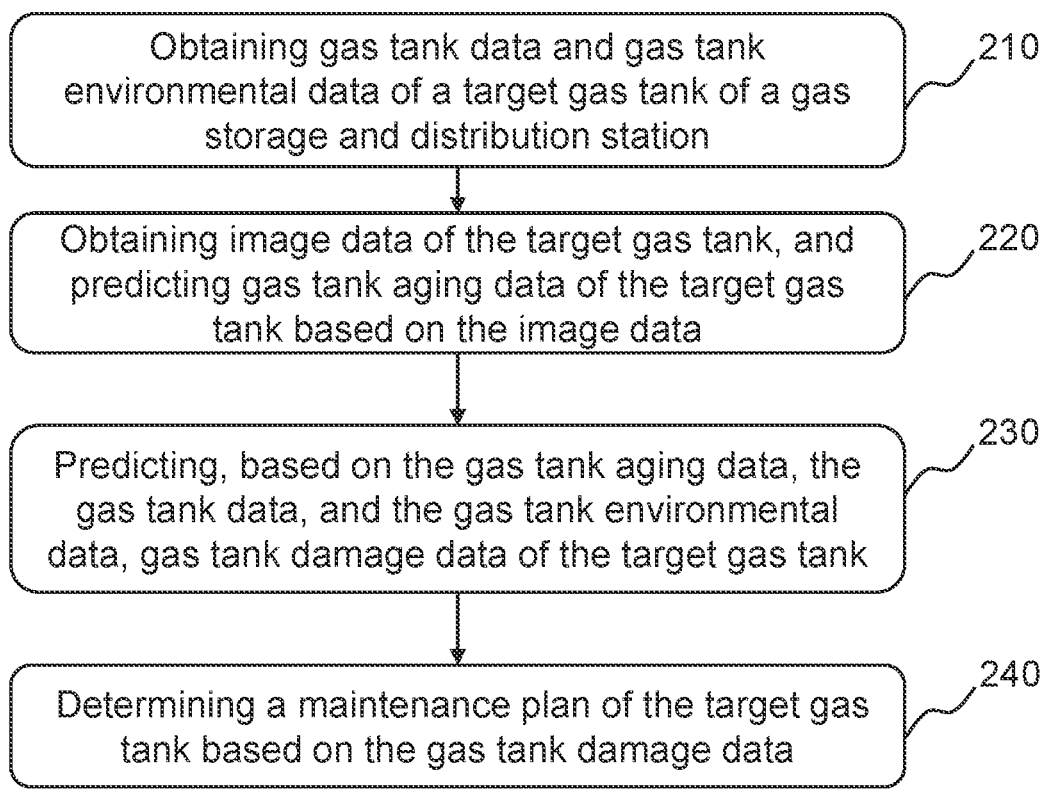
FIG. 2 is a flowchart illustrating an exemplary process of a method for maintaining and managing a storage and distribution station of smart gas according to some embodiments of the present disclosure.

For further description regarding the target gas tank, the gas tank data, the gas tank environmental data, the image data, the gas tank aging data, and the gas tank damage data, please refer to FIG. 2 and related description thereof.

In some embodiments, the smart gas device management platform 130 may include a smart gas indoor device management sub-platform 131, a smart gas pipeline network device management sub-platform 132, and the smart gas data center 133. In some embodiments, the smart gas indoor device management sub-platform 131 may be in a bidirectional interaction with the smart gas data center 133, and the smart gas indoor device management sub-platform 131 may obtain indoor device management data from the smart gas data center 133 and feedback the indoor device management data to the smart gas data center 133. In some embodiments, the smart gas pipeline network device management sub-platform 132 may be in a bidirectional interaction with the smart gas data center 133, and the smart gas pipeline network device management sub-platform 132 may obtain pipeline network device management data (e.g., the gas tank data, the gas tank environmental data) from the smart gas data center 133 and feedback the pipeline network device management data to the smart gas data center 133.

In some embodiments, the information interaction between the smart gas device management platform 130 and the upper smart gas service platform 120, and the information interaction between the smart gas device management platform 130 and the lower smart gas sensor network platform 140 may be performed through the smart gas data center 133. The smart gas data center 133 may aggregate and store all operation data of the IoT operating system. In some embodiments, the smart gas data center 133 may receive the query instruction of the user issued by the smart gas service platform 120 (e.g., the query instruction issued by the smart operation service sub-platform 122), and send the gas tank data and the gas tank environmental data extracted based on the query instruction of the user to the smart gas pipeline network device management sub-platform 132 for analysis and processing. The smart gas pipeline network device management sub-platform 132 may send the processed data and the maintenance plan of the gas tank to the smart gas data center 133. The smart gas data center 133 may send the aggregated and processed data (e.g., the gas tank aging data, the gas tank damage data) and the maintenance plan of the gas tank to the smart gas service platform 120. In some embodiments, the smart gas data center 133 may issue an instruction for obtaining information related to the gas tank (e.g., the gas tank data, the gas tank environmental data) to the smart gas sensor network platform 140, and receive the information related to the gas tank uploaded by the sensor network platform 140.

In some embodiments, the smart gas pipeline network device management sub-platform 132 may include a device ledger management module 1321, a device maintenance record management module 1322, and a device status management module 1323. In some embodiments, the device ledger management module 1321 may be configured to implement a diversified and classified management on the gas tanks by category and area. In some embodiments, the device ledger management module 1321 may extract basic information such as a model, a specification, a quantity, a position, etc. of the gas tank, and operation information such as an installation time, a running time, etc. from the smart gas data center 133. In some embodiments, the device maintenance record management module 1322 may be configured to implement upgrade management of the gas tank. In some embodiments, the device maintenance record management module 1322 may extract data such as a maintenance record, a repair record, and an inspection record of the gas tank from the smart gas data center 133. In some embodiments, the device status management module 1323 may be configured to check a current operating status, an estimated service life, etc. of the gas tank.

In some embodiments, the smart gas pipeline network device management sub-platform 132 may further include other management modules, and different management modules may perform different functions, which is not limited here.

The smart gas sensor network platform 140 may refer to a platform for unified management of sensor communication. In some embodiments, the smart gas sensor network platform 140 may be configured as a communication network and a gateway. The smart gas sensor network platform 140 may use a plurality of sets of gateway servers or a plurality of sets of intelligent routers, which are not limited here.

In some embodiments, the smart gas sensor network platform 140 may connect the smart gas equipment management platform 130 and the smart gas object platform 150 to realize the functions of perceptual information sensor communication and control information sensor communication. In some embodiments, the smart gas sensor network platform 140 may interact with the smart gas object platform 150, issue an instruction for obtaining information related to the gas tank to the smart gas object platform 150, and receive the information related to the gas tank uploaded by the smart gas object platform 150. In some embodiments, the smart gas sensor network platform 140 may interact with the smart gas data center 133 of the smart gas device management platform 130, receive the instruction for obtaining the information related to the gas tank issued by the smart gas data center 133, and upload the information related to the gas tank to the smart gas data center 133.

In some embodiments, the smart gas sensor network platform 140 may include a smart gas indoor device sensor network sub-platform 141 and a smart gas pipeline network device sensor network sub-platform 142. In some embodiments, the smart gas indoor device sensor network sub-platform 141 may correspond to a smart gas indoor device object sub-platform 151, and may be configured to obtain data related to an indoor device. In some embodiments, the smart gas pipeline network device sensor network sub-platform 142 may correspond to a smart gas pipeline network device object sub-platform 152, and may be configured to obtain data related to a pipeline network device (e.g., the gas tank data, the gas tank environmental data).

The smart gas object platform 150 may refer to a platform for obtaining the information related to the gas tank. In some embodiments, the smart gas object platform 150 may be configured as various gas-related devices such as a pipeline network device (e.g., the gas tank of each gas storage and distribution station, etc.), a device for maintaining the gas tank, etc.), a monitoring device (e.g., a camera device, an environmental monitoring device, etc.).

In some embodiments, the smart gas object platform 150 may interact with the smart gas sensor network platform 140, receive the instruction for obtaining the information related to the gas tank issued by the smart gas sensor network platform 140, and upload the information related to the gas tank to the smart gas sensor network platform 140.

In some embodiments, the smart gas object platform 150 may include the smart gas indoor device object sub-platform 151 and the smart gas pipeline network device object sub-platform 152. In some embodiments, the smart gas indoor device object sub-platform 151 may correspond to the smart gas indoor device sensor network sub-platform 141, obtain data related to the indoor device, and upload the data related to the indoor device to the smart gas data center 133 through the smart gas indoor device sensor network sub-platform 141. In some embodiments, the smart gas pipeline network device object sub-platform 152 may correspond to the smart gas pipeline network device sensor network sub-platform 142, obtain data related to the pipeline network device (e.g., the information related to the gas tank), and upload the data related to the pipeline network device to the smart gas data center 133 through the smart gas pipeline network device sensor network sub-platform 142.

In some embodiments of the present disclosure, by constructing the IoT system 100 for maintaining and managing a storage and distribution station of smart gas using an IoT functional system structure of five platforms, and adopting a mode of combining the main platform and the sub-platforms, a data processing burden of the general platform may be shared, independence between different types of data may be guaranteed, and classified transmission, traceability of the data and classified issuance and processing of instructions may be ensured, which can make the structure and data processing of the IoT clear and controllable, and facilitate the management, control, and data processing of the IoT.

FIG. 2 is a flowchart illustrating an exemplary process of a method for maintaining and managing a storage and distribution station of smart gas according to some embodiments of the present disclosure. In some embodiments, the process 200 may be executed by a smart gas device management platform. As shown in FIG. 2, the process 200 may include the following operations.

In 210, obtaining gas tank data and gas tank environmental data of a target gas tank of a gas storage and distribution station.

The target gas tank may be a tank that needs to be maintained. For example, the target gas tank may be a gas tank that has been used for a long time and has a high degree of aging, or a damaged gas tank.

The gas tank data may refer to data that characterizes inherent information of the gas tank itself, for example, a tank body thickness, a type of an anti-corrosion layer, a thickness of the anti-corrosion layer, etc. of the gas tank.

The gas tank environmental data may refer to data that characterizes information of the environment where the gas tank is located, for example, an ambient temperature, an ambient humidity, a light condition, and a rain condition of an area where the gas tank is located.

In some embodiments, a smart gas object platform may obtain the gas tank data and the gas tank environmental data through various pipeline network devices and monitoring devices, and upload the gas tank data and the gas tank environmental data to a smart gas data center. The pipeline network device may be a gas tank of each gas storage and distribution station, and a device used for maintenance of the gas tank (e.g., a device for spraying paint, spraying preservatives, etc.), etc. The monitoring device may be a camera device, an environmental monitoring device (e.g., various devices such as a thermometer, a hygrometer, an anemoscope, etc.), etc. In some embodiments, the smart gas object platform may periodically (e.g., monthly) obtain and update the gas tank data and the gas tank environmental data.

In 220, obtaining image data of the target gas tank, and predicting gas tank aging data of the target gas tank based on the image data.

The image data may refer to image information about the gas tank obtained based on various image obtaining devices. For example, the image data may be thermal imaging data of the gas tank obtained by a thermal imaging device. As another example, the image data may be optical imaging data of the gas tank obtained by a color camera.

In some embodiments, the smart gas object platform may obtain the image data of the gas tank through various image obtaining devices, and upload the image data to the smart gas data center. In some embodiments, the smart gas object platform may periodically (e.g., monthly) obtain and update the image data.

The gas tank aging data may refer to a degree of aging of a surface of the gas tank. For example, the anti-corrosion layer of the gas tank may be peeled off or thinned, the anti-corrosion layer has cracks or rust stains, etc. The gas tank aging data may be indicated by a vector. In some embodiments, the gas tank aging data may include a position, an area, severity, etc. of the gas tank aging. For example, (1, 4, 2, 3) may indicate that the anti-corrosion layer of area 1 of the target gas tank falls off (assuming that 4 indicates that the anti-corrosion layer falls off), a fallen-off area is 2 m$^2$, and the severity is level 3 (assuming that the severity is indicated as level 1-5, and the higher the level is, the more serious the aging is).

In some embodiments, the smart gas device management platform may perform modeling or use various data analysis algorithms, such as regression analysis, discriminant analysis, etc., to analyze and process the image data to predict the gas tank aging data of the target gas tank.

In some embodiments, the smart gas device management platform may predict the gas tank aging data of the target gas tank by processing the image data based on an aging model. For further description regarding the aging model, please refer to FIG. 3 and the related description thereof.

In 230, predicting, based on the gas tank aging data, the gas tank data, and the gas tank environmental data, gas tank damage data of the target gas tank.

The gas tank damage data may refer to data that characterizes a specific condition of a gas tank needing to be maintained. The gas tank damage data may be indicated by a vector. In some embodiments, the gas tank damage data may include a position, a cause, an area, and a thickness of the aging and damage, and a risk of leakage or damage of the target gas tank within a period of time in the future (e.g., within the next month). For example, (1, 4, 2, 2.2, 60) may indicate that the anti-corrosion layer of area 1 of the target gas tank may fall off within the next month (assuming that 4 indicates that the anti-corrosion layer falls off), the fallen-off area may be 2 m$^2$, the thickness of the anti-corrosion layer that has fallen off may be 2.2 mm, and the risk of the leakage or the damage in the area 1 of the target gas tank may be 60%.

In some embodiments, the smart gas device management platform may perform the modeling or use various data analysis algorithms, such as regression analysis, discriminant analysis, etc., to analyze and process the gas tank aging data, the gas tank data, and the gas tank environmental data to predict the gas tank damage data of the target gas tank.

In some embodiments, the smart gas device management platform may predict the gas tank damage data of the target gas tank by processing the gas tank aging data, the gas tank data, and the gas tank environmental data based on a damage model. For further description regarding the damage model, please refer to FIG. 4, FIG. 5 and the related description thereof.

In 240, determining a maintenance plan of the target gas tank based on the gas tank damage data.

In some embodiments, the smart gas device management platform may perform the modeling or use various data analysis algorithms, such as regression analysis, discriminant analysis, etc. to analyze and process the gas tank damage data to determine the maintenance plan of the target gas tank.

In some embodiments, the smart gas device management platform may determine, based on the gas tank damage data of different target gas tanks, the maintenance plan of the target gas tank using a vector matching mode.

In some embodiments, the smart gas device management platform may establish, based on historical gas tank damage data of a historical gas tank, a reference vector corresponding to the historical gas tank, and store the reference vector in the smart gas data center. Each reference vector may correspond to a reasonable maintenance plan (such as welding reinforcement, anti-corrosion layer re-coating, anti-corrosion layer coating, rust removal, etc.). The smart gas device management platform may establish a vector to be matched based on the gas tank damage data of the target gas tank, and respectively calculate a distance between the reference vector and the vector to be matched through a vector distance calculation mode (e.g., a Euclidean distance, a Manhattan distance, a Chebyshev distance, a cosine distance of included angle, etc.), take a reference vector whose distance from the vector to be matched satisfies a preset condition as a target vector, and take a maintenance plan corresponding to the target vector as the maintenance plan corresponding to the vector to be matched, that is, the maintenance plan of the target gas tank. In some embodiments, the preset condition may be set manually according to an actual condition. For example, the preset condition may be that the vector distance is the smallest or the vector distance is smaller than a certain threshold.

In some embodiments of the present disclosure, the maintenance plan of the gas tank may be determined by processing the gas tank data and the gas tank environmental data. In this way, an actual condition of the gas tank and the environment where the gas tank is located may be comprehensively considered, so that the final maintenance plan can be more scientific and reasonable. In addition, the maintenance plan of the gas tank may be determined through the IoT system for maintaining and managing a storage and distribution station of smart gas, which can make the maintenance of the gas tank timelier, reduce the labor time cost, improve the production efficiency, and effectively ensure the safety and reliability of gas use.

It should be noted that the above description about the process 200 is merely for example and illustration, and not intended to limit the scope of the present disclosure. For those skilled in the art, various modifications and changes can be made to the process 200 under the guidance of the present disclosure. However, such modifications and changes are still within the scope of the present disclosure.

Figure 3:
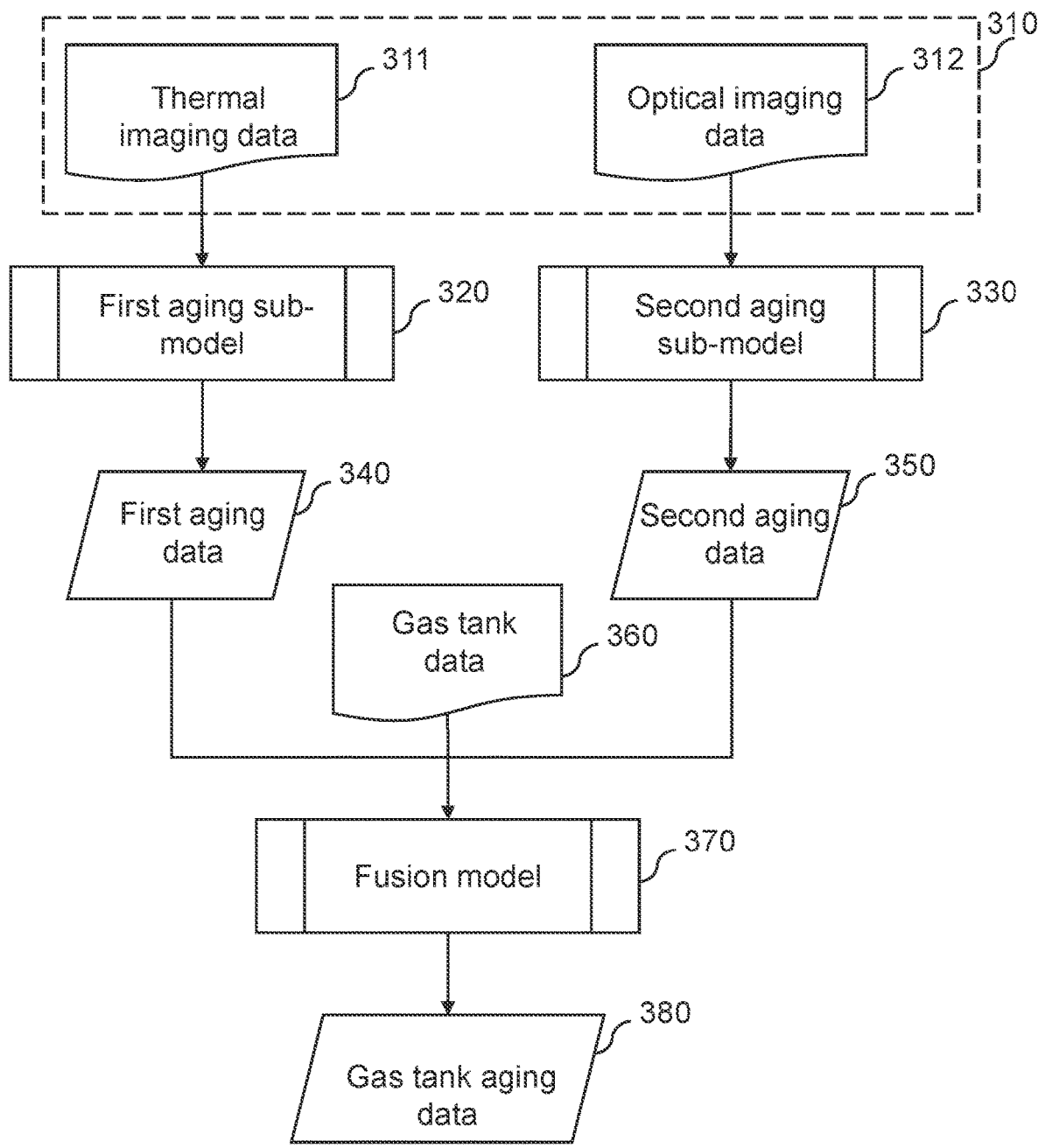
FIG. 3 is a schematic diagram illustrating an exemplary process for determining gas tank aging data based on an aging model according to some embodiments of the present disclosure.

FIG. 3 is a schematic diagram illustrating an exemplary process for determining gas tank aging data based on an aging model according to some embodiments of the present disclosure.

In some embodiments, a smart gas device management platform may predict the gas tank aging data of a target gas tank by processing image data based on the aging model.

In some embodiments, the image data may include thermal imaging data and optical imaging data. For further description regarding the image data, please refer to FIG. 2 and related description thereof.

The thermal imaging data may refer to data containing gas tank image information obtained based on a thermal imaging device. For example, the thermal imaging data may be information on a gas tank leakage contained in a thermal image and a temperature value of the gas tank.

In some embodiments, a smart gas object platform may obtain the thermal imaging data through the thermal imaging device (e.g., a thermal imaging camera, an infrared thermal imager, etc.), and upload the thermal imaging data to a smart gas data center. In some embodiments, the smart gas object platform may periodically (e.g., monthly) obtain and update the thermal imaging data.

The optical imaging data may refer to data containing gas tank image information obtained based on an optical imaging device. For example, the optical imaging data may be information on a gas tank surface damage contained in a colored picture of the gas tank.

In some embodiments, a smart gas object platform may obtain the optical imaging data through the optical imaging device (such as a camera, etc.), and upload the optical imaging data to the smart gas data center. In some embodiments, the smart gas object platform may periodically (e.g., monthly) obtain and update the optical imaging data.

The aging model may refer to a model used to predict the gas tank aging data of the target gas tank. In some embodiments, the aging model may be a machine learning model.

As shown in FIG. 3, the aging model may include a first aging sub-model 320, a second aging sub-model 330, and a fusion model 370. In some embodiments, the aging model may process image data 310 to determine gas tank aging data 380 of the target gas tank.

In some embodiments, the first aging sub-model 320 may process thermal imaging data 311 to obtain first aging data 340. As shown in FIG. 3, an input of the first aging sub-model 320 may include the thermal imaging data 311 (e.g., temperature value data of the gas tank, etc.), and an output may include the first aging data 340. The first aging data may refer to data that summarizes and characterizes a feature of the thermal imaging data. The first aging data may be indicated by a vector, for example, (1, 37, 2, 38, 3, 37) indicates that the temperature of position 1 of the target gas tank is 37° C., the temperature of position 2 is 38° C., and the temperature of position 3 is 37° C. In some embodiments, the first aging sub-model 320 may be a convolutional neural networks (CNN) model.

In some embodiments, the first aging sub-model 320 may be trained independently based on historical data. In some embodiments, the first aging sub-model 320 may be obtained through training based on a plurality of training samples and labels.

In some embodiments, the training sample of the first aging sub-model may include sample thermal imaging data. The label may be first aging data corresponding to the sample thermal imaging data. The training sample may be obtained based on the historical data, and the label of the training sample may be determined by manual labeling or automatic labeling. The above description is merely an example rather than a limitation, and the label of the training data may be obtained in various ways.

In some embodiments, the second aging sub-model 330 may process optical imaging data 312 to obtain second aging data 350. As shown in FIG. 3, an input of the second aging sub-model 330 may include the optical imaging data 312 (e.g., appearance crack data of the gas tank, etc.), and an output may include the second aging data 350. The second aging data may refer to data that summarizes and characterizes a feature of the optical imaging data. The second aging data may be indicated by a vector, for example, (1, 1.5, 2, 1.7, 3, 0) indicates that there is a crack in a range of 1.5 $m^2$ at position 1 of the target gas tank, a crack in a range of 1.7 $m^2$ at position 2, and no crack at position 3. In some embodiments, the second aging sub-model 330 may be a CNN model.

In some embodiments, the second aging sub-model 330 may be trained independently based on the historical data. In some embodiments, the second aging sub-model 330 may be obtained through training based on a plurality of training samples and labels.

In some embodiments, the training sample of the second aging sub-model may include sample optical imaging data. The label may be second aging data corresponding to the sample optical imaging data. The training sample may be obtained based on the historical data, and the label of the training sample may be determined by manual labeling or automatic labeling. The above description is merely an example rather than a limitation, and the label of the training data may be obtained in various ways.

In some embodiments, the fusion model 370 may process the first aging data 340, the second aging data 350, and gas tank data 360 to obtain the gas tank aging data 380. As shown in FIG. 3, an input of the fusion model 370 may include the first aging data 340, the second aging data 350, and the gas tank data 360, and an output may include the gas tank aging data 380. For further description regarding the gas tank data and the gas tank aging data, please refer to FIG. 2 and related description thereof. In some embodiments, the fusion model 370 may be a neural networks (NN) model.

In some embodiments, the outputs of the first aging sub-model 320 and the second aging sub-model 330 may be the input of the fusion model 370. The fusion model 370 may be obtained through joint training based on a trained first aging sub-model 320 and a trained second aging sub-model 320.

In some embodiments, first sample data of the joint training may include the sample thermal imaging data, the sample optical imaging data, and sample gas tank data. A first label corresponding to the first sample data may be sample gas tank aging data. The first sample data may be obtained based on the historical data, and the first label may be determined by manual labeling or automatic labeling. The sample thermal imaging data of the gas tank may be input to the first aging sub-model 320 to obtain the first aging data output by the first aging sub-model 320. The sample optical imaging data of the gas tank may be input to the second aging sub-model 330 to obtain the second aging data output by the second aging sub-model 330. The first aging data and the second aging data may be taken as training sample data and input to an initial fusion model together with the sample gas tank data to obtain the gas tank aging data output by the initial fusion model. A loss function may be constructed based on the gas tank aging data and the sample gas tank aging data output by the fusion model, and parameters of the fusion model may be updated. Through the parameter updating, a trained fusion model 370 may be obtained.

In some embodiments of the present disclosure, the gas tank aging data may be determined by processing the image data of the gas tank, and the gas tank may be analyzed from two aspects of the thermal imaging and the optical imaging, which can make full use of various image data, and effectively improve accuracy of model prediction. Moreover, independent training of the first aging sub-model and the second aging sub-model may ensure sufficient training data, and the joint training of the independently trained first aging sub-model and second aging sub-model with the fusion model may reduce demand for a training data volume in the joint training and improve processing efficiency.

Figure 4:
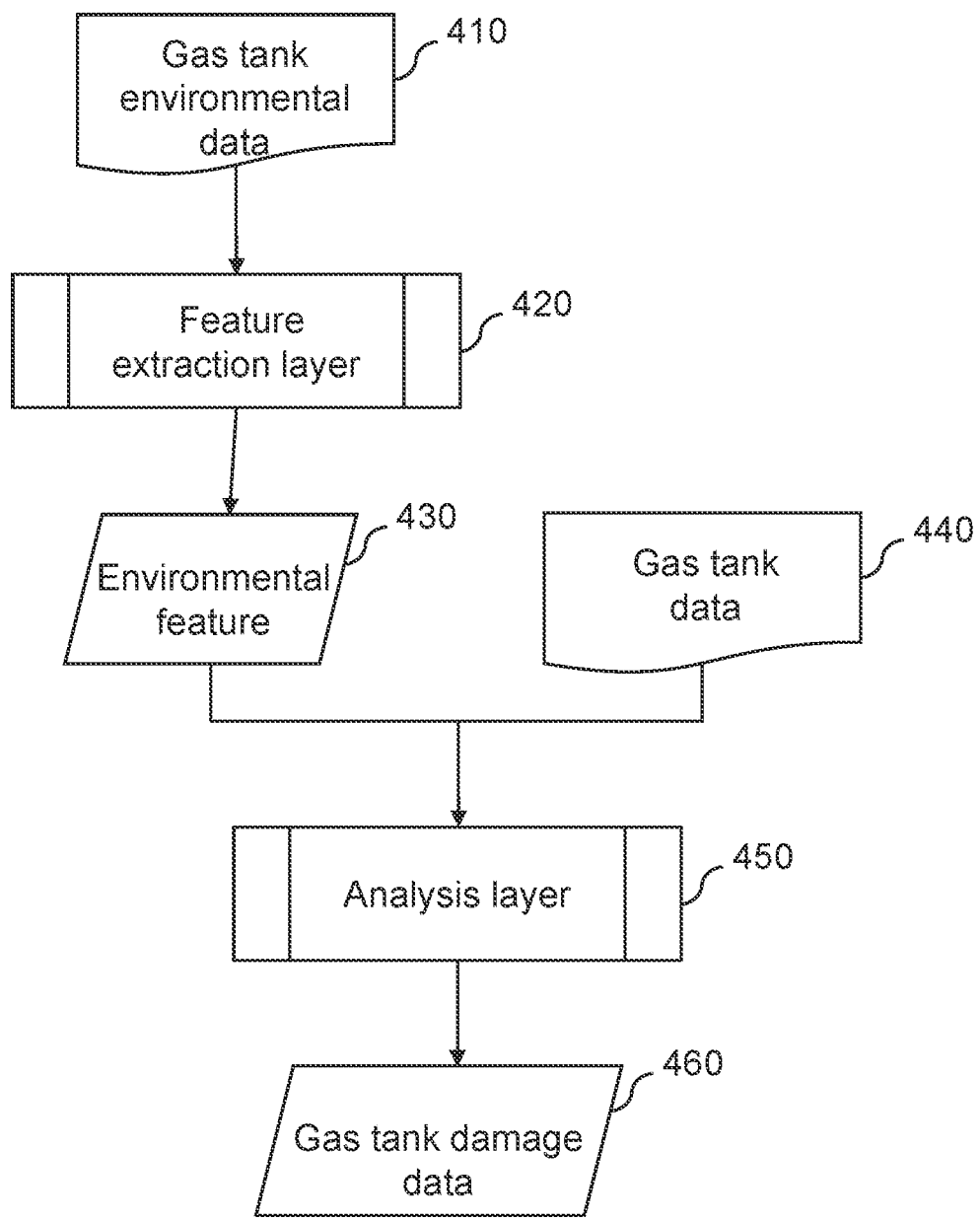
FIG. 4 is a schematic diagram illustrating an exemplary process for determining gas tank damage data based on a damage model according to some embodiments of the present disclosure.

FIG. 4 is a schematic diagram illustrating an exemplary process for determining gas tank damage data based on a damage model according to some embodiments of the present disclosure.

In some embodiments, a smart gas device management platform may predict the gas tank damage data of a target gas tank by processing gas tank data and gas tank environmental data based on the damage model.

The damage model may refer to a model used to predict the gas tank damage data of the target gas tank. In some embodiments, the damage model may be a machine learning model.

As shown in FIG. 4, the damage model may include a feature extraction layer 420 and an analysis layer 450. In some embodiments, the damage model may process the gas tank environmental data 410 and the gas tank data 440 to determine the gas tank damage data 460 of the target gas tank.

In some embodiments, the feature extraction layer 420 may process the gas tank environmental data 410 to obtain an environmental feature 430. As shown in FIG. 4, an input of the feature extraction layer 420 may include the gas tank environmental data 410 (e.g., an ambient temperature, an ambient humidity, etc.), and an output may include the environmental feature 430. The environmental feature may refer to a feature that summarizes and characterizes the gas tank environmental data. The environmental feature may be indicated by a vector. For example, (25, 500, 60, 107) may indicate that an average temperature of an environment where the target gas tank is located in the last month is 25° C., an average monthly precipitation is 500 mm, a relative humidity is 60%, and a count of an average monthly sunshine hours is 105 h. In some embodiments, the feature extraction layer 420 may be various feasible neural network models such as a CNN model, a deep neural networks (DNN) model, or the like, or any combination thereof.

In some embodiments, the analysis layer 450 may process the environmental feature 430 and the gas tank data 440 to obtain the gas tank damage data 460. As shown in FIG. 4, an input of the analysis layer 450 may include the environmental feature 430 and the gas tank data 440, and an output may include the gas tank damage data 460. For further description regarding the gas tank data and the gas tank damage data, please refer to FIG. 2 and related description thereof. In some embodiments, the analysis layer 450 may be various feasible neural network models such as a CNN model, a DNN model, or the like, or any combination thereof.

In some embodiments, the output of the feature extraction layer 420 may be the input of the analysis layer 450. The damage model may be obtained through joint training based on the feature extraction layer 420 and the analysis layer 450.

In some embodiments, second sample data of the joint training may include sample gas tank environmental data and sample gas data. A second label corresponding to the second sample data may be sample gas tank damage data. The second sample data may be obtained based on historical data, and the second label may be determined by manual labeling or automatic labeling. The sample gas tank environmental data of the gas tank may be input to an initial feature extraction layer to obtain the environmental feature output by the initial feature extraction layer. The environmental feature may be taken as training sample data and input to an initial analysis layer together with the sample gas tank data of the gas tank to obtain the gas tank damage data output by the initial analysis layer. A loss function may be constructed based on the sample gas tank damage data and the gas tank damage data output by the analysis layer, and parameters of the feature extraction layer and the analysis layer may be updated synchronously. Through the parameter updating, a trained feature extraction layer and a trained analysis layer may be obtained.

In some embodiments of the present disclosure, by processing the gas tank environmental data to determine the gas tank damage data using the damage model, the gas tank damage data may be determined in combination with different environments in which different gas tanks are located. The consideration of an actual condition of the environment where the gas tank is located can strengthen scientificity and rationality of the determination of the gas tank damage data, and effectively help staff to formulate a maintenance plan that matches the actual condition of the gas tank in different areas.

Figure 5:
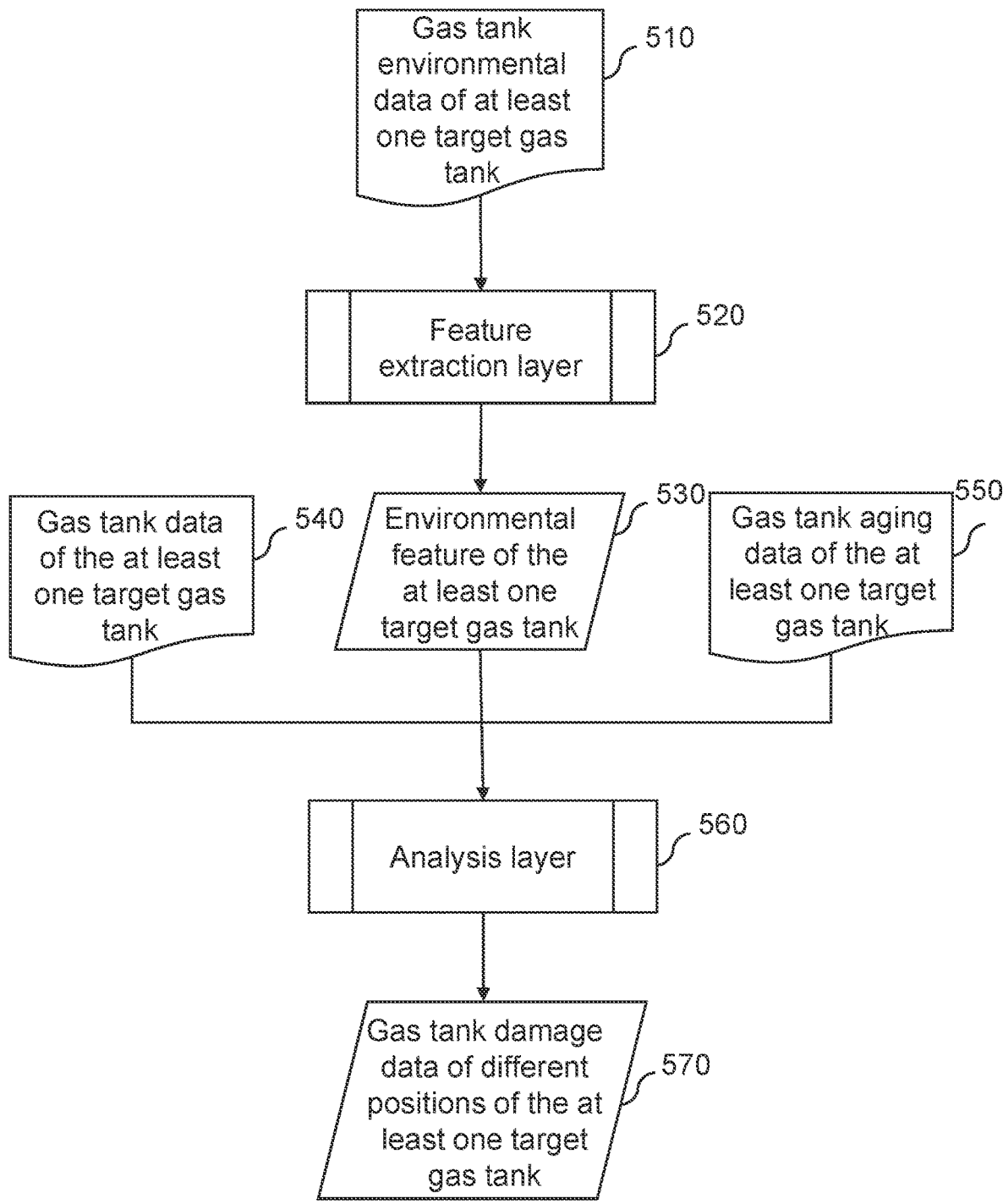
FIG. 5 is a schematic diagram illustrating an exemplary process for determining gas tank damage data of different positions of a target gas tank based on a damage model according to some embodiments of the present disclosure.

FIG. 5 is a schematic diagram illustrating an exemplary process for determining gas tank damage data of different positions of a target gas tank based on a damage model according to some embodiments of the present disclosure.

In some embodiments, a smart gas device management platform may process gas tank aging data of at least one target gas tank to obtain the gas tank damage data of different positions of the at least one target gas tank.

For further description regarding the gas tank aging data and the gas tank damage data, please refer to FIG. 2 and related description thereof.

In some embodiments, the smart gas device management platform may process the gas tank aging data of the at least one target gas tank based on the damage model to obtain the gas tank damage data of different positions of the at least one target gas tank.

As shown in FIG. 5, the damage model may include a feature extraction layer 520 and an analysis layer 560. In some embodiments, the damage model may process gas tank environmental data 510 of the at least one target gas tank, gas tank data 540 of the at least one target gas tank, and gas tank aging data 550 of the at least one target gas tank to determine gas tank damage data 570 of different positions of the at least one target gas tank.

The feature extraction layer 520 of the damage model may share parameters with the feature extraction layer 420 of the damage model, that is, the feature extraction layer 520 of the damage model may be directly obtained by the feature extraction layer 420 of the damage model. For further description regarding the feature extraction layer 420 of the damage model, please refer to FIG. 4 and related description thereof.

In some embodiments, the analysis layer 560 may process an environmental feature 530 of the at least one target gas tank, the gas tank data 540 of the at least one target gas tank, and the gas tank aging data 550 of the at least one target gas tank to obtain the gas tank damage data 570 of different positions of the at least one target gas tank. As shown in FIG. 5, an input of the analysis layer 560 may include the environmental feature 530 of the at least one target gas tank (for example, (6, 25, 500, 60, 107) may indicate that an average temperature of an environment where the target gas tank 6 is located in the last month is 25° C., an average monthly precipitation is 500 mm, a relative humidity is 60%, and a count of an average monthly sunshine hours is 105 h), the gas tank data 540 of the at least one target gas tank (for example, (6, 5, 2, 3) may indicate that the target gas tank 6 has a tank body thickness of 5 mm, a type of an anti-corrosion layer of painting, and a thickness of the anti-corrosion layer of 3 mm), and the gas tank aging data 550 of the at least one target gas tank (for example, (6, 1, 4, 2, 3) may indicate that the anti-corrosion layer of area 1 of the target gas tank 6 falls off (assuming that 4 indicates that the anti-corrosion layer falls off), the fallen-off area is 2 $m^2$, the severity is level 3). An output of the analysis layer 560 may include the gas tank damage data 570 of different positions of the at least one target gas tank (for example, (6, 1, 4, 2, 2.2, 60) may indicate that the anti-corrosion layer of area 1 of the target gas tank 6 may fall off within the next month (assuming that 4 indicates that the anti-corrosion layer falls off), the fallen-off area may be 2 $m^2$, the thickness of the anti-corrosion layer that has fallen off may be 2.2 mm, and a risk of leakage or damage in the area may be 60%). In some embodiments, the analysis layer 560 may be various feasible neural network models such as a CNN model, a DNN model, or the like, or any combination thereof.

In some embodiments, the output of the feature extraction layer 520 may be the input of the analysis layer 560. The damage model may be obtained through joint training of based on the feature extraction layer 520 and the analysis layer 560.

In some embodiments, third sample data of the joint training may include a plurality of training samples. Each training sample may include the gas tank environmental data, the gas tank data, and the gas tank aging data of a sample gas tank. A third label corresponding to each training sample may be the gas tank damage data of different positions of the sample gas tank. The third sample data may be obtained based on historical data, and the third label may be determined by manual labeling or automatic labeling. The gas tank environmental data of the sample gas tank in the third sample data may be input to an initial feature extraction layer to obtain the environmental feature of the gas tank output by the initial feature extraction layer. The environmental feature of the gas tank may be taken as the training sample data and input to an initial analysis layer together with the gas tank data of the sample gas tank, the gas tank aging data of the sample gas tank to obtain the gas tank damage data output by the initial analysis layer. A loss function may be constructed based on the sample gas tank damage data and the gas tank damage data output by the analysis layer, and parameters of the feature extraction layer and the analysis layer may be updated synchronously. Through the parameter updating, a trained feature extraction layer and a trained analysis layer may be obtained.

For further description regarding the gas tank environmental data, the gas tank data, the gas tank aging data, and the gas tank damage data, please refer to FIG. 2 and related description thereof. For further description regarding the environmental feature, please refer to FIG. 4 and related description thereof.

In some embodiments of the present disclosure, by processing the gas tank environmental data, the gas tank data, and the gas tank aging data of the at least one target gas tank based on the damage model, the gas tank damage data of different positions of the at least one target gas tank may be obtained. In this way, damage of different positions of a plurality of gas tanks may be considered, thereby improving efficiency of data processing, and formulating maintenance plans of different positions for the plurality of gas tanks in time to ensure safety of gas use.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for maintaining and managing a storage and distribution station of smart gas, executed by a smart gas device management platform of an Internet of Things (IoT) system for maintaining and managing a storage and distribution station of smart gas, wherein the IoT system for maintaining and managing the storage and distribution station of smart gas further includes a smart gas user platform, a smart gas service platform, a smart gas sensor network platform, and a smart gas object platform, comprising:

obtaining gas tank data and gas tank environmental data of a target gas tank of a gas storage and distribution station through pipeline network devices and monitoring devices of the smart gas object platform, wherein the pipeline network devices include a device for spraying paint and spraying preservatives, and the monitoring devices include a thermometer, a hygrometer, and an anemoscope;

obtaining image data of the target gas tank through thermal imaging devices and optical imaging devices of the smart gas object platform, and predicting gas tank aging data of the target gas tank based on the image data via an aging model, wherein the aging model is a machine learning model, the aging model includes a first aging sub-model, a second aging sub-model, and a fusion model, the image data includes thermal imaging data and optical imaging data, the first aging sub-model is configured to process the thermal imaging data to obtain first aging data, the second aging sub-model is configured to process the optical imaging data to obtain second aging data, and the fusion model is configured to process the first aging data, the second aging data, and the gas tank data to obtain the gas tank aging data of the target gas tank, and an input of the fusion model includes outputs of the first aging sub-model and the second aging sub-model, the fusion model is obtained through a first joint training based on a trained first aging sub-model and a trained second aging sub-model, first sample data of the first joint training includes sample thermal imaging data, sample optical imaging data, and sample gas tank data, and a first label corresponding to the first sample data is sample gas tank aging data, the first sample data is obtained based on historical data, and the first label is determined by manual labeling or automatic labeling; and the first joint training includes: inputting the sample thermal imaging data of the gas tank into the first aging sub-model to obtain the first aging data output by the first aging sub-model, inputting the sample optical imaging data of the gas tank into the second aging sub-model to obtain the second aging data output by the second aging sub-model, taking the first aging data and the second aging data as first training sample data, inputting the first training sample data into an initial fusion model together with the sample gas tank data to obtain gas tank aging data output by the initial fusion model, constructing a first loss function based on the gas tank aging data and the sample gas tank aging data output by the fusion model, and updating parameters of the fusion model, and obtaining a trained fusion model is obtained through the updating parameters of the fusion model;

predicting, based on the gas tank aging data, the gas tank data, and the gas tank environmental data, gas tank damage data of the target gas tank;

determining a maintenance plan of the target gas tank based on the gas tank damage data, wherein the maintenance plan includes welding reinforcement, anti-corrosion layer re-coating, anti-corrosion layer coating, and rust removal;

receiving a query instruction of a user issued by the smart gas user platform, and uploading the maintenance plan of the target gas tank to the smart gas user platform.

2. The method of claim 1, wherein in the IoT system for maintaining and managing the storage and distribution station of smart gas, the smart gas user platform includes a gas user sub-platform, a government user sub-platform, and a supervision user platform;

the smart gas service platform includes a smart gas user service sub-platform corresponding to the gas user sub-platform, a smart operation service sub-platform corresponding to the government user sub-platform, and a smart supervision service sub-platform corresponding to a supervision user sub-platform;

the smart gas device management platform includes a smart gas indoor device management sub-platform, a smart gas pipeline network device management sub-platform, and a smart gas data center, wherein the smart gas pipeline network device management sub-platform includes a device ledger management module, a device maintenance record management module, and a device status management module;

the smart gas sensor network platform includes a smart gas indoor device sensor network sub-platform and a smart gas pipeline network device sensor network sub-platform; and the smart gas object platform includes a smart gas indoor device object sub-platform and a smart gas pipeline network device object sub-platform.

3. The method of claim 1, wherein the predicting, based on the gas tank aging data, the gas tank data, and the gas tank environmental data, gas tank damage data of the target gas tank comprises:

predicting the gas tank damage data of the target gas tank by processing the gas tank data and the gas tank environmental data based on a damage model.

4. The method of claim 3, wherein the damage model includes a feature extraction layer and an analysis layer, wherein the feature extraction layer is configured to process the gas tank environmental data to obtain an environmental feature;

the analysis layer is configured to process the gas tank data and the environmental feature to obtain the gas tank damage data of the target gas tank;

an output of the feature extraction layer is an input of the analysis layer, and the damage model is obtained through a second joint training based on the feature extraction layer and the analysis layer, second sample data of the second joint training includes sample gas tank environmental data and sample gas data, a second label corresponding to the second sample data is sample gas tank damage data, the second sample data is obtained based on the historical data, and the second label is determined by manual labeling or automatic labeling; and the second joint training includes: inputting the sample gas tank environmental data of the gas tank into an initial feature extraction layer to obtain environmental feature output by the initial feature extraction layer, taking the environmental feature as second training sample data, inputting the second training sample data into an initial analysis layer together with the sample gas tank data of the gas tank to obtain gas tank damage data output by the initial analysis layer, contrasting a second loss function based on the sample gas tank damage data and the gas tank damage data output by the analysis layer, updating parameters of the feature extraction layer and the analysis layer synchronously, obtaining a trained feature extraction layer and a trained analysis layer through the updating parameters of the feature extraction layer and the analysis layer.

5. The method of claim 3, wherein the damage model is further configured to:

process the gas tank aging data of at least one target gas tank to obtain the gas tank damage data of different positions of the at least one target gas tank.

6. The method of claim 1, wherein the determining a maintenance plan of the target gas tank based on the gas tank damage data comprises:

determining, based on the gas tank damage data of different target gas tanks, the maintenance plan of the target gas tank using a vector matching mode.

7. An Internet of Things (IoT) system for maintaining and managing a storage and distribution station of smart gas, comprising: a smart gas user platform, a smart gas service platform, a smart gas device management platform, a smart gas sensor network platform, and a smart gas object platform, wherein the smart gas object platform is configured to obtain gas tank data and gas tank environmental data of a target gas tank of a gas storage and distribution station through pipeline network devices and monitoring devices of the smart gas object platform, wherein the pipeline network devices include a device for spraying paint and spraying preservatives, and the monitoring devices include a thermometer, a hygrometer, and an anemoscope, the smart gas object platform is further configured to obtain image data of the target gas tank of the gas storage and the distribution station through thermal imaging devices and optical imaging devices of the smart gas object platform, and transmit the gas tank data, the gas tank environmental data, and the image data to the smart gas device management platform through the smart gas sensor network platform;

the smart gas device management platform is configured to:

predict gas tank aging data of the target gas tank based on the image data via an aging model, wherein the aging model is a machine learning model, the aging model includes a first aging sub-model, a second aging sub-model, and a fusion model, the image data includes thermal imaging data and optical imaging data, the first aging sub-model is configured to process the thermal imaging data to obtain first aging data, the second aging sub-model is configured to process the optical imaging data to obtain second aging data, and the fusion model is configured to process the first aging data, the second aging data, and the gas tank data to obtain the gas tank aging data of the target gas tank, and an input of the fusion model includes outputs of the first aging sub-model and the second aging sub-model, the fusion model is obtained through a first joint training based on a trained first aging sub-model and a trained second aging sub-model, first sample data of the first joint training includes sample thermal imaging data, sample optical imaging data, and sample gas tank data, and a first label corresponding to the first sample data is sample gas tank aging data, the first sample data is obtained based on historical data, and the first label is determined by manual labeling or automatic labeling; and the first joint training includes: inputting the sample thermal imaging data of the gas tank into the first aging sub-model to obtain the first aging data output by the first aging sub-model, inputting the sample optical imaging data of the gas tank into the second aging sub-model to obtain the second aging data output by the second aging sub-model, taking the first aging data and the second aging data as first training sample data, inputting the first training sample data into an initial fusion model together with the sample gas tank data to obtain gas tank aging data output by the initial fusion model, constructing a first loss function based on the gas tank aging data and the sample gas tank aging data output by the fusion model, and updating parameters of the fusion model, and obtaining a trained fusion model is obtained through the updating parameters of the fusion model;

predict, based on the gas tank aging data, the gas tank data, and the gas tank environmental data, gas tank damage data of the target gas tank;

determine a maintenance plan of the target gas tank based on the gas tank damage data wherein the maintenance plan includes welding reinforcement, anti-corrosion layer re-coating, anti-corrosion layer coating, and rust removal;

receive a query instruction of a user issued by the smart gas user platform; and upload the maintenance plan of the target gas tank to the smart gas user platform; and the smart gas service platform is configured to send the maintenance plan of the target gas tank to the smart gas user platform.

8. The IoT system of claim 7, wherein the smart gas user platform includes a gas user sub-platform, a government user sub-platform, and a supervision user platform;

the smart gas service platform includes a smart gas user sub-platform corresponding to the gas user sub-platform, a smart operation service sub-platform corresponding to the government user sub-platform, and a smart supervision service sub-platform corresponding to a supervision user sub-platform;

the smart gas device management platform includes a smart gas indoor device management sub-platform, a smart gas pipeline network device management sub-platform, and a smart gas data center, wherein the smart gas pipeline network device management sub-platform includes a device ledger management module, a device maintenance record management module, and a device status management module;

the smart gas sensor network platform includes a smart gas indoor device sensor network sub-platform and a smart gas pipeline network device sensor network sub-platform; and the smart gas object platform includes a smart gas indoor device object sub-platform and a smart gas pipeline network device object sub-platform.

9. The IoT system of claim 7, wherein the smart gas device management platform is further configured to:

predict the gas tank damage data of the target gas tank by processing the gas tank data and the gas tank environmental data based on a damage model.

10. The IoT system of claim 9, wherein the damage model includes a feature extraction layer and an analysis layer, wherein the feature extraction layer is configured to process the gas tank environmental data to obtain an environmental feature;

the analysis layer is configured to process the gas tank data and the environmental feature to obtain the gas tank damage data of the target gas tank;

an output of the feature extraction layer is an input of the analysis layer, and the damage model is obtained through a second joint training based on the feature extraction layer and the analysis layer, second sample data of the second joint training includes sample gas tank environmental data and sample gas data, a second label corresponding to the second sample data is sample gas tank damage data, the second sample data is obtained based on the historical data, and the second label is determined by manual labeling or automatic labeling; and the second joint training includes: inputting the sample gas tank environmental data of the gas tank into an initial feature extraction layer to obtain environmental feature output by the initial feature extraction layer, taking the environmental feature as second training sample data, inputting the second training sample data into an initial analysis layer together with the sample gas tank data of the gas tank to obtain gas tank damage data output by the initial analysis layer, contrasting a second loss function based on the sample gas tank damage data and the gas tank damage data output by the analysis layer, updating parameters of the feature extraction layer and the analysis layer synchronously, obtaining a trained feature extraction layer and a trained analysis layer through the updating parameters of the feature extraction layer and the analysis layer.

11. The IoT system of claim 9, wherein the damage model is further configured to:
  process the gas tank aging data of at least one target gas tank to obtain the gas tank damage data of different positions of the at least one target gas tank.

12. The IoT system of claim 7, wherein the smart gas device management platform is further configured to:
  determine, based on the gas tank damage data of different target gas tanks, the maintenance plan of the target gas tank using a vector matching mode.

13. The method of claim 1, wherein the method is implemented by a non-transitory computer-readable storage medium configured to execute the method.

* * * * *